(12) United States Patent
Cai

(10) Patent No.: US 10,863,736 B2
(45) Date of Patent: Dec. 15, 2020

(54) ALIQUOTING AND FREEZING STORAGE DEVICE

(71) Applicant: Xiaomin Cai, College Station, TX (US)

(72) Inventor: Xiaomin Cai, College Station, TX (US)

(*) Notice: Subject to any disclaimer, the term of this patent is extended or adjusted under 35 U.S.C. 154(b) by 248 days.

(21) Appl. No.: 15/315,508

(22) PCT Filed: Jul. 27, 2016

(86) PCT No.: PCT/CN2016/091865
§ 371 (c)(1),
(2) Date: Dec. 1, 2016

(87) PCT Pub. No.: WO2017/012594
PCT Pub. Date: Jan. 26, 2017

(65) Prior Publication Data
US 2017/0189901 A1    Jul. 6, 2017

Related U.S. Application Data

(63) Continuation-in-part of application No. 14/085,150, filed on Nov. 20, 2013, now abandoned.

(30) Foreign Application Priority Data

Jul. 20, 2015 (CN) ..................... 2015 2 0525156 U

(51) Int. Cl.
*G01N 1/42* (2006.01)
*A01N 1/02* (2006.01)
*B01L 9/06* (2006.01)

(52) U.S. Cl.
CPC ............ *A01N 1/0263* (2013.01); *B01L 9/065* (2013.01); *G01N 1/42* (2013.01); *B01L 2200/025* (2013.01); *B01L 2300/0609* (2013.01); *B01L 2300/0809* (2013.01); *B01L 2300/0838* (2013.01); *B01L 2300/0841* (2013.01); *B01L 2300/16* (2013.01); *B01L 2300/1894* (2013.01)

(58) Field of Classification Search
CPC ........... B01L 3/50825; B01L 2300/046; B01L 9/065; B01L 2300/0838; B01L 2300/1894; G01N 1/42
See application file for complete search history.

(56) References Cited

U.S. PATENT DOCUMENTS 4,024,857 A * 5/1977 Blecher ............ A61B 5/150022
422/419
4,738,827 A * 4/1988 Pierotti ............. G01N 15/1209
422/562
5,579,929 A * 12/1996 Schwartz ................. B01L 9/06
206/446

(Continued)

*Primary Examiner* — Jill A Warden
*Assistant Examiner* — Dwayne K Handy
(74) *Attorney, Agent, or Firm* — Guosheng Wang; United States Research and Patent Firm

(57) ABSTRACT

An aliquoting and freezing storage device comprises a test tube and at least one capillary tube. The capillary tube is inserted into a test tube, and the capillary tube is provided with an inner long hole which penetrates throughly. The device utilizes the capillarity to quickly and easily store biological samples in the capillary tubes. When needed, the operator only needs to remove one or several of the tubes, without affecting the remaining biological samples, so as to avoid repeated freezing and thawing of biological samples.

6 Claims, 4 Drawing Sheets

(56) References Cited

U.S. PATENT DOCUMENTS

| | | | | |
|---|---|---|---|---|
| 6,193,892 B1 * | 2/2001 | Krueger | ................... | B01L 9/06 |
| | | | | 209/223.1 |
| 6,652,809 B1 * | 11/2003 | Comley | ................. | B01L 9/065 |
| | | | | 422/547 |
| 2009/0029341 A1 * | 1/2009 | Fuhr | ................... | A01N 1/0268 |
| | | | | 435/1.3 |
| 2010/0152895 A1 * | 6/2010 | Dai | ......................... | G01N 1/42 |
| | | | | 700/245 |

* cited by examiner

ALIQUOTING AND FREEZING STORAGE DEVICE

FIELD OF THE INVENTION

The present invention is related to a biological lab device, and more specifically, to an aliquot and frozen storage device.

BACKGROUND OF THE INVENTION

After separation and purification of biological samples, such as RNA, DNA, protein solutions, biological reagents, bacteria, culture cells, stem cells, patient samples, infant cord blood, etc., cryopreservation technology is used to keep them in a semi-dormant or fully dormant state, preventing them from dying for a certain timeframe. Then, by providing appropriate conditions to restore the vitality of the sample when needed, can the smooth progress of biological research and application really be guaranteed.

The cryopreservation method is a traditional biological sample preservation method, which has the advantages of a long shelf life and good preservation of the sample. Most of the bio-sample storage institutions adopt this method as their main preservation method.

However, due to the physical properties of biological samples, they are easily degraded and destroyed during freeze-thaw cycles, which seriously affect the subsequent experimental, inspection and therapeutic effects. In order to avoid this problem, the operator has to spend a lot of time to dispense the biological sample into multiple tubes, and use the appropriate amount of tubes when needed to reduce the number of freeze-thaw cycles per sample. However, the above-described process requires not only a great deal of manpower and time to complete, but also that the group preforming the cryptopreservation has adequate storage space. Because of this, this method has high costs, and requires a special refrigerating apparatus. Finding a new, innovative preservation technology that solves the issue of storage and training requirements would benefit the life science field.

Figure 1:
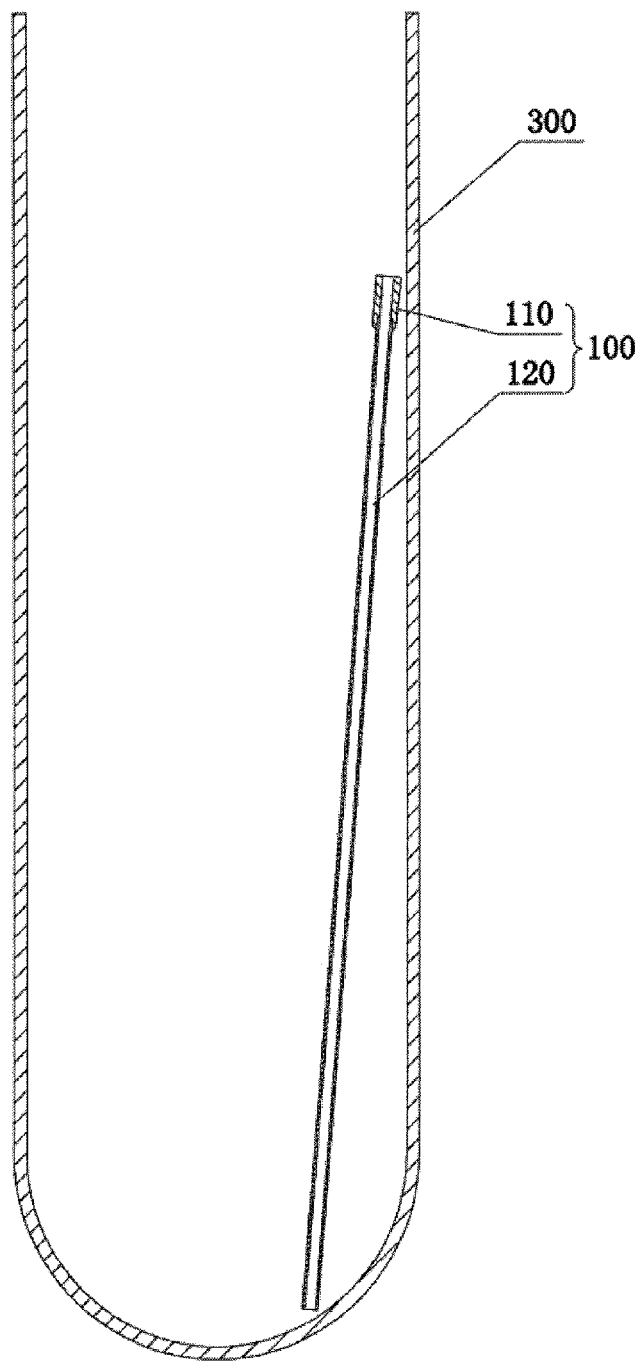
FIG. 1 is a cross-sectional view of the device according to Embodiment 1.

In the drawings, the reference numbers represent the following: 100—capillary tube, 110—capillary handle, 120—capillary body, 200—capillary supporter, 210—support plate, 211—positioning hole, 212—protruding main handle, 220—leg, 221—positioning hook, and 300—test tube.

DETAILED DESCRIPTIONS OF THE INVENTION

The object of this invention is to overcome the above mentioned drawbacks and disadvantages, and to provide an aliquoting-freezing storage device.

The technical solution to achieve the object of the presented invention is as follows.

An apparatus for aliquoting-freezing storage comprises a test tube and at least one capillary tube, wherein the capillary tube is inserted into a test tube, and the capillary tube is provided with an inner long hole (channel) penetrating therethrough.

The capillary tube comprises a coaxial capillary handle and a capillary body. The capillary handle is fixed in place at the upper end of the capillary body.

The capillary outer wall is coated with a non-sticky film.

The apparatus for aliquoting-freezing storage further comprises a capillary supporter. The capillary tube is arranged in the capillary supporter; the capillary supporter's outer-diameter is matched with the inner-diameter of the test tube; and the capillary supporter is provided with positioning holes which are uniformly distributed in the circumference.

The minimum orifice diameter of the positioning hole is larger than the outer diameter of the capillary body and smaller than the outer diameter of the capillary tube handle.

The capillary supporter comprises a supporting plate and a supporting leg. The supporting leg stands outside the supporting plate lower surface. The upper surface of the support plate is circular, and the central surface of the upper surface is provided with an outwardly protruding main handle. The positioning hole is arranged at the supporting plate surrounding the protruding main handle.

The supporting legs comprise at least two strips and are fixedly arranged at the outer edge of the bottom of the supporting plate; and the legs are circumferentially arranged with the center of the support plate.

The supporting leg is a hollow cylinder; the bottom edge of the supporting plate is formed with a groove which fits with the leg; and the leg is embedded in the groove of the support plate.

The capillary supporter comprises a supporting plate and supporting legs. The supporting legs comprises at least two strips and are fixedly arranged at the outer edge of the top surface of the supporting plate. The top of the support plate is circular, and the center of the upper surface is provided with protruding main handle. The positioning holes are arranged in the circumference of the center protruding main handle of the support plate. The supporting legs are circumferentially arranged around the center of the support plate. The top of the leg is provided with the outward positioning hook. The diameter of the outer part of the positioning hook is larger than the inner diameter of the tube.

The aliquoting-freezing storage device utilizes the capillarity of the capillaries to quickly and easily store the biological samples in the capillary tubes. When needed, the operator only needs to take one or several, without affecting the remaining biological samples, therefore to avoid repeated freezing and thawing of bio-samples. Compared with the traditional packing operation, the device is easy to disassemble, and can save time, human labor and material usage.

DETAILED DESCRIPTION OF SPECIFIC IMPLEMENTATION

The invention will now be described in further detail with reference to the accompanying drawings. All of the drawings are for the purpose of explaining the present technical solution only and are not intended to limit the scope of the protection scope of this patent.

Embodiment 1

An aliquoting freezing storage device, as shown in FIG. 1, comprises a test tube 300 and at least one capillary tube 100.

The capillary tube 100 is provided with an inner elongated hole which penetrates vertically. The capillary tube 100 is inserted into the test tube 300.

Preferably, the capillary tube 100 comprises capillary tube handle 110 and a capillary body 120 disposed co-axially therewith. The capillary tube handle 110 is fixedly provided at the upper end of the capillary body 120. Further, the capillary handle 110 is mated, snap, glued or threaded to the capillary body 120. The capillary handle 110 has a pore size greater than that of the capillary body 120 and facilitates blowing of air from the top of the capillary handle 110 such that the biological sample in the capillary tube 100 flows out of the bottom of the capillary tube 100.

Preferably, the outer wall of the capillary tube 100 is coated with a non-sticking film. The non-sticking film is a plastic film or other non-wetting film. Under the non-sticking effect, the outer wall of the capillary tube 100 does not adhere to the biological sample when the capillary tube 100 is taken out from storage.

Capillary body 120 may be any type and design of the capillary. Preferably, the capillary body 120 is a glass capillary, a silicon capillary, a plastic capillary, or a plastic coated glass capillary. More preferably, the capillary body 120 is a plastic coated glass capillary to increase the strength.

During assembly, the operator places the capillary tube 100 into the tube 300 containing the biological sample by pinching the capillary handle 110. By the capillarity, the biological sample in the tube 300 will automatically enter the capillary 100 almost uniformly. The entire device is then stored at low temperature. When necessary, the operator takes one of the capillaries 100 by grasping the capillary handle 110, thereby taking the biological sample. At the same time, all other samples are still frozen. After a few seconds, the biological sample in the capillary tube 100 is thawed into a new tube for use in the next step.

Embodiment 2

Figure 2:
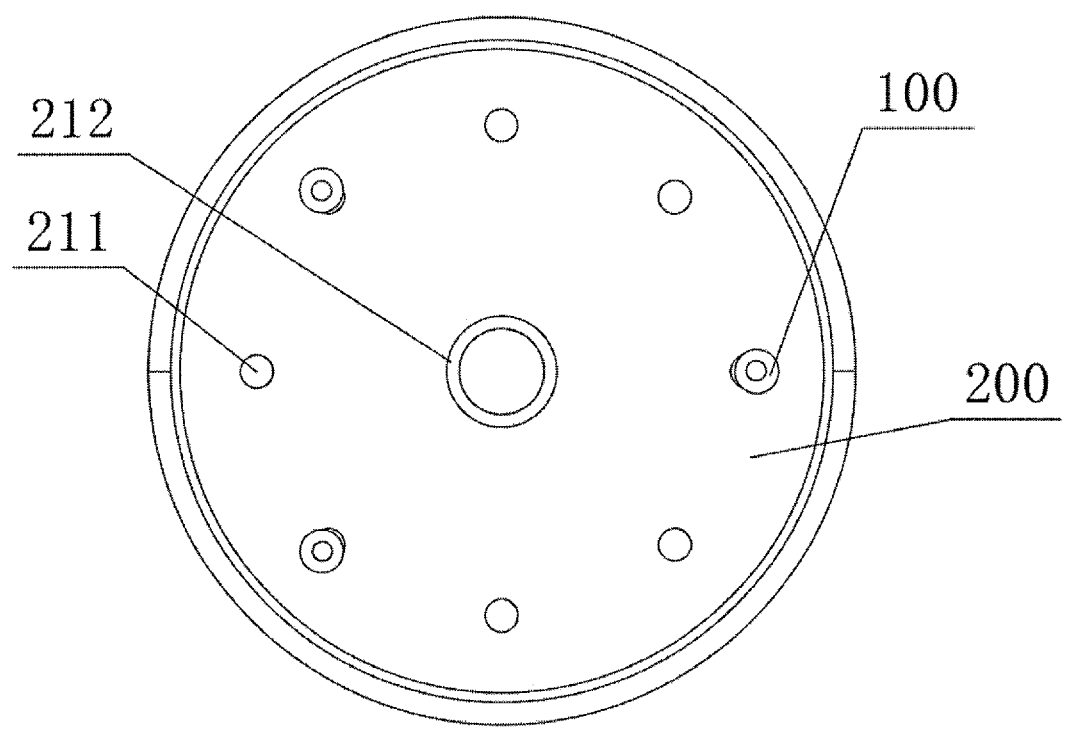
FIG. 2 is a plan view of the device according to Embodiment 2.
Figure 3:
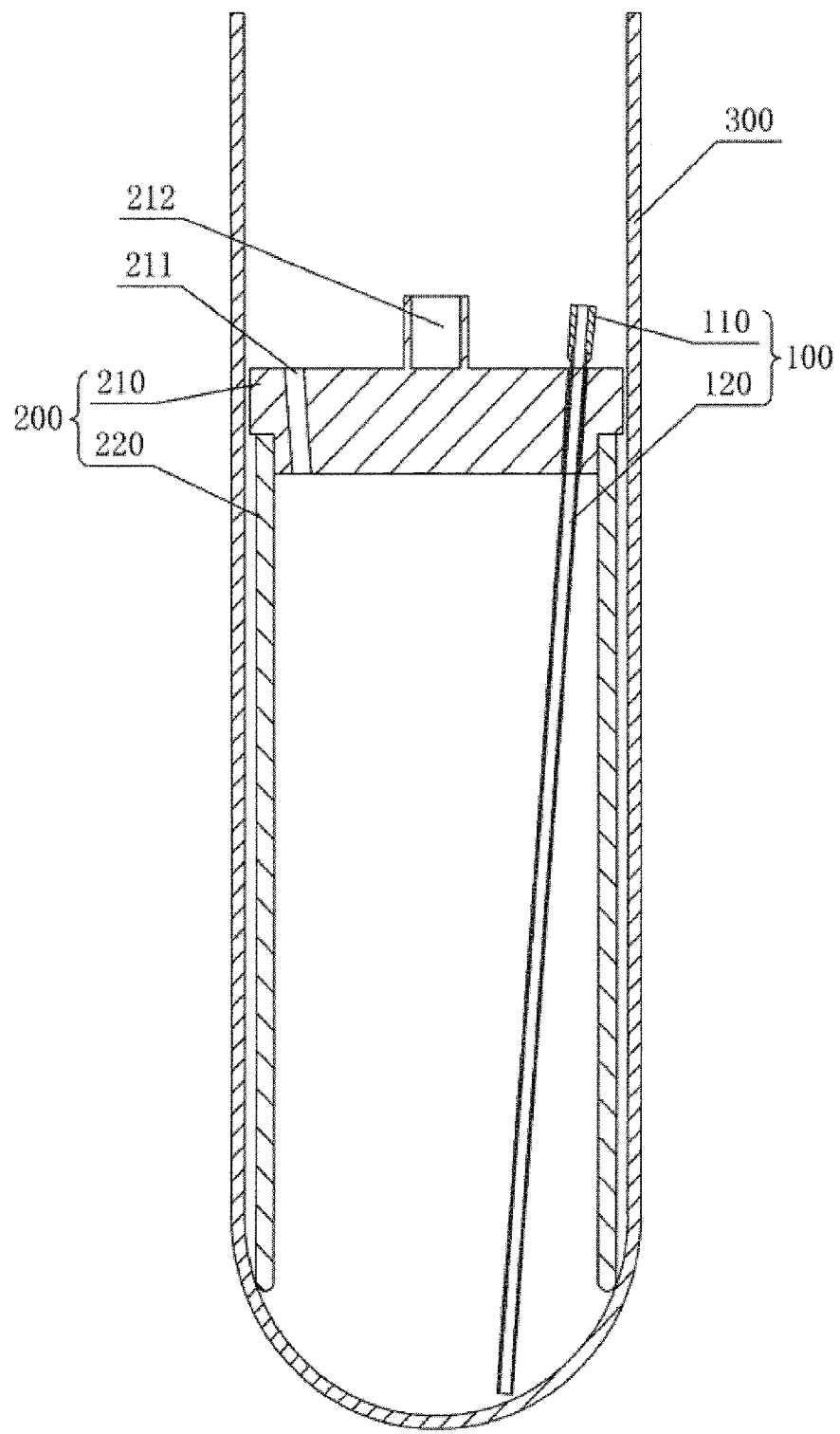
FIG. 3 is a cross-sectional view of the device according to Embodiment 2.

As shown in FIGS. 2 and 3, the aliquoting-freezing system comprises a test tube 300, a capillary supporter 200, and at least one capillary tube 100.

The capillary tube 100 is provided with an inner long hole which penetrates through. The capillary tube 100 is inserted into the capillary supporter 200. The capillary tube 100 includes a capillary handle 110 and a capillary body 120 disposed co-axially. The capillary handle 110 is fixedly disposed at the upper end of the capillary body 120, and preferably, the capillary handle 110 is inserted, snagged, glued, or screwed to the capillary body 120. The capillary handle 110 has a pore size greater than that of the capillary body 120 and facilitates the pipetter to blow air from the top of the capillary handle 110 such that the biological sample in the capillary tube 100 flows out of the bottom of the capillary tube.

Capillary body 120 may be any type and design of the capillary. Preferably, the capillary body 120 is a glass capillary, a silicon capillary, a plastic capillary, or a plastic coated glass capillary. More preferably, the capillary body 120 is a plastic coated glass capillary to increase the strength.

Preferably, the outer wall of the capillary tube 100 is coated with a non-stick film. The non-stick film uses a plastic film or other non-wetting film. Under the action of the non-stick film, the outer wall of the capillary tube 100 does not adhere to the biological sample when the capillary tube 100a is taken out from storage.

The capillary supporter 200 is provided with positioning holes 211 which are uniformly distributed in the circumferential direction. The minimum orifice diameter of the positioning hole 211 is larger than the outer diameter of the capillary body 120 and smaller than the outer diameter of the capillary handle 110.

Preferably, the bottom of the positioning hole 211 is inclined inwardly, and when the capillary tube 100 is inserted in the positioning hole 211, the bottom of the capillary tube 100 is close to the depression of the bottom of the test tube 300, so that the capillary 100 absorbs a sufficient amount of sample.

Preferably, the positioning hole 211 is formed in a cylindrical shape having narrow top and wide bottom. When the capillary tube 100 is inserted into the positioning hole 211, the bottom of the capillary tube 100 can be moved appropriately to facilitate the capillary tube 100 to select a portion of the sample.

The outer-diameter of capillary supporter 200 is matched with the inner-diameter of the test tube 300; The capillary support 200 includes a support plate 210 and support legs 220, and the leg 220 is disposed on the outer edge of the bottom of the support plate 210. The upper surface of the support plate 210 has a circular shape, and an upper protruding main handle 212 is provided at the center of the upper surface. The positioning holes 211 are annularly arrayed on the support plate 210 with the protruding main handle 212 as a center.

Preferably, the legs 220 are striped and have at least two strips, and are fixedly disposed at the bottom outer edge of the support plate 210. And the legs 220 are circumferentially around the support plate 210. For example, when there are two legs 220, the two legs 220 are relatively fixed to the outer edge of the base of the support plate 210. When there are three legs 220, the three legs 220 are arranged at each apex of the equilateral triangle.

As an alternative, the legs 220 are hollow cylinders. The bottom edge of the support plate 210 is recessed to form a groove that fits with the leg 220. The leg 220 is inserted into the groove of the support plate 210.

During assembly, the operator places the capillary supporter 200 into the test tube 300 containing the biological sample by clamping the protruding main handle 212. The bottom of the leg 220 abuts against the inner wall of the test tube 300 to position the height of the capillary holder 200, and then the capillary tube 100 is inserted into the capillary holder 200. Using the capillarity, the biological sample in the tube 300 will automatically enter the capillary 100 almost uniformly. The entire device is then stored at low temperature. When necessary, the operator takes one of the capillaries 100 by grasping the capillary handle 110, thereby taking the biological sample. At the same time, all other samples are still frozen. After a few seconds, the biological sample in the capillary tube 100 is thawed into a new tube for use.

Embodiment 3

Figure 4:
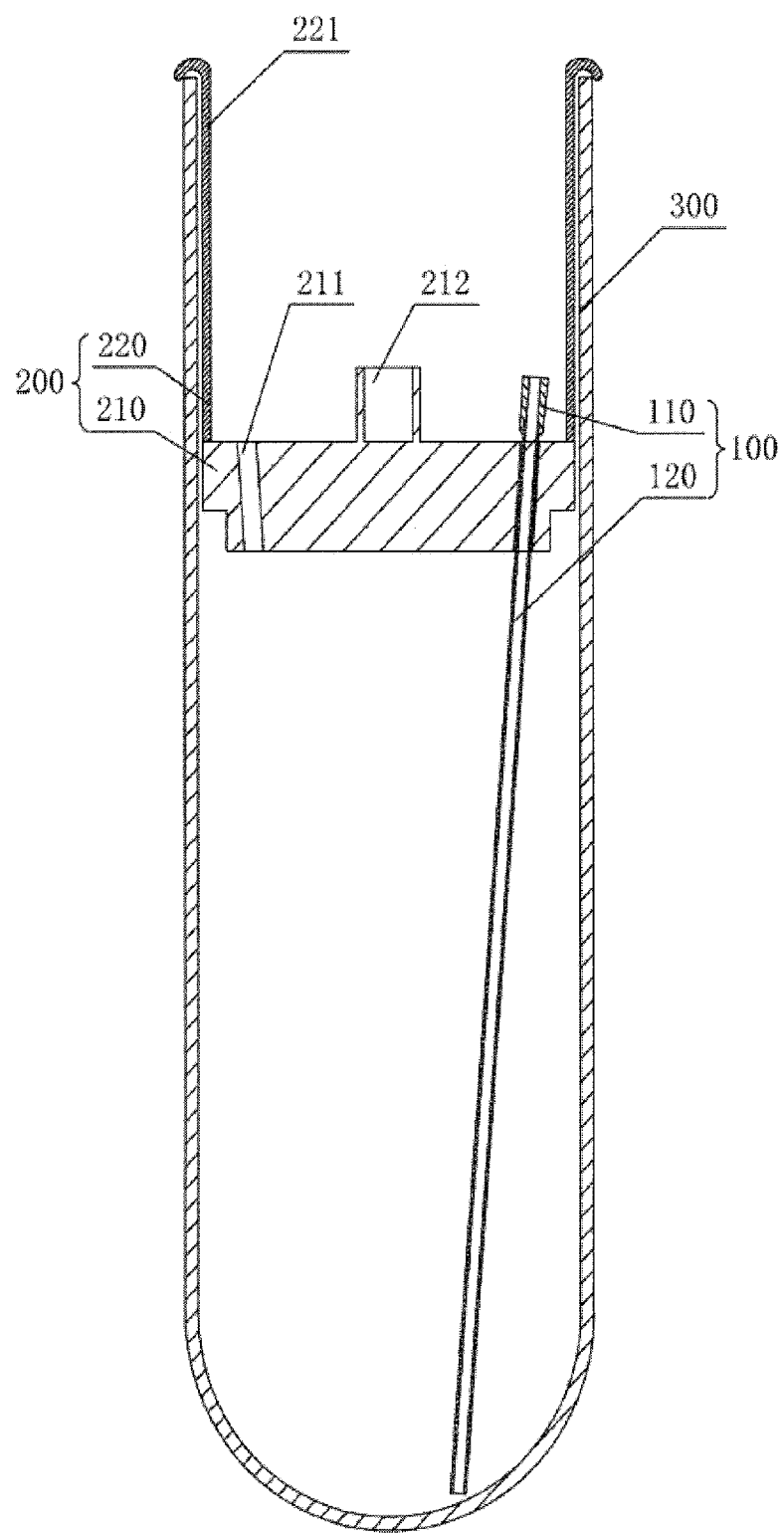
FIG. 4 is a cross-sectional view of the device according to embodiment 3.

In the present embodiment, as shown in FIG. 4, the capillary holder 200 includes a support plate 210 and support leg 220.

The legs 220 are at least two strips and are fixedly disposed at the outer edge of the top of the support plate 210. And the legs 220 are circumferentially surround the support plate 210. For example, when two legs 220 are provided, the two legs 220 are relatively fixed to the outer edge of the top of the support plate 210. When there are three legs 220, the three legs 220 are arranged at each apex of the equilateral triangle. The top of the leg 220 is provided with an outwardly locating hook 221. The outer diameter of the positioning hook 221 is larger than the inner diameter of the test tube 300.

At the time of installation, the positioning hook 221 is snapped at the opening of the test tube 300, thereby positioning the height of the capillary holder 200.

The rest of the present embodiment is the same as that of the embodiment 2, and will not be described again.

In embodiments 1, 2 and 3, the apparatus is used in conjunction with a refrigeration-freezing unit. Under the action of the freezing device, the device is in the temperature range of −80° C.~−20° C., to ensure the frozen storage of biological samples.

The present invention has been described with reference to the embodiments, and several modifications and improvements can be made without departing from the principles of the present invention. It should be noted that the technical solutions obtained by means of equivalent substitution or equivalent transformation are within the scope of the present invention.

The invention claimed is:

1. An aliquoting-freezing storage device comprising a test tube (300), a capillary supporter (200), and at least one capillary tube (100) having an upper and a lower end,
   wherein the capillary tube (100) contains a frozen sample in storage,
   wherein the capillary tube (100) is inserted in the test tube (300), and the capillary tube (100) has a long hole through the upper and the lower end,
   wherein the test tube (300) also contains the frozen sample that is outside the capillary tube (100) and at the bottom of the test tube (300),
   wherein the capillary tube (100) is threaded through the capillary supporter (200); the capillary supporter's (200) outer-diameter is matched with the inner-diameter of the test tube (300); the capillary support (200) is provided with the positioning holes (211) which are uniformly distributed in the circumferential direction, and
   wherein the capillary supporter (200) comprises a support plate (210) and legs (220), the legs (220) are provided on the bottom outer edge of the support plate (210); the upper surface of the support plate (210) is circular and has a main handle (212) which is convex at the center of the upper surface; and the positioning holes (211) are annularly arrayed around the main handle (212) on the support plate (210).

2. The aliquoting-freezing storage device according to claim 1, wherein the capillary tube (100) comprises a co-axial capillary tube handle (110) and a capillary body (120); and the capillary tube handle is fixedly disposed at the upper end of the capillary body (120).

3. The aliquoting-freezing storage device according to claim 1, characterized in that the outer wall of the capillary tube (100) is coated with a non-sticking film.

4. The aliquoting-freezing storage device according to claim 1, characterized in that the legs (220) are in strip foul) and have at least two strips, and are fixedly disposed at the bottom outer edge of the support plate (210); and the support legs (220) are circumferentially arranged around the center of the support plate (210).

5. The aliquoting-freezing storage device according to claim 1, characterized in that the legs (220) are a hollow cylinder; the bottom edge of the support plate (210) is concavely shaped to conform to the legs (220); and the legs (220) are inserted into a groove of the support plate (210).

6. An aliquoting-freezing storage device comprising a test tube (300), a capillary supporter (200), and at least one capillary tube (100) having an upper and a lower end,
   wherein the capillary tube (100) contains a frozen sample in storage,
   wherein the capillary tube (100) is inserted in the test tube (300), and the capillary tube (100) has a long hole through the upper and the lower end,
   wherein the test tube (300) also contains the frozen sample that is outside the capillary tube (100) and at the bottom of the test tube (300),
   wherein the capillary tube (100) is threaded through the capillary supporter (200); the capillary supporter's (200) outer-diameter is matched with the inner-diameter of the test tube (300); the capillary support (200) is provided with positioning holes (211) which are uniformly distributed in the circumferential direction, and
   wherein the capillary holder (200) comprises a support plate (210) and legs (220); the legs (220) each has a strip shape and has at least two strips, and are fixedly arranged on the top outer edge of the support plate (210); the support plate (210) is circular, and the central of the upper surface is provided with an outwardly protruding main handle (212), the positioning holes (211) are arranged at the top of the support plate (210); the legs (220) are circumferentially arranged around the center of the support plate (210); the top of the legs (220) are provided with an outward positioning hook (221); and the outer diameter of the positioning hook (221) is larger than the inner diameter of the test tube (300).

* * * * *